(12) United States Patent
Adams et al.

(10) Patent No.: US 10,189,027 B2
(45) Date of Patent: Jan. 29, 2019

(54) HIGH CAPACITY SEPARATION OF METALS FROM AUTO SHREDDER RESIDUE

(71) Applicant: SA Recycling LLC, Orange, CA (US)

(72) Inventors: Mike Adams, Anaheim Hills, CA (US); Clifford Glen Newby, Orange, CA (US); Alex Meza, Chino, CA (US); George Adams, Orange, CA (US)

(73) Assignee: SA Recycling LLC, Orange, CA (US)

( * ) Notice: Subject to any disclaimer, the term of this patent is extended or adjusted under 35 U.S.C. 154(b) by 0 days.

(21) Appl. No.: 15/729,597

(22) Filed: Oct. 10, 2017

(65) Prior Publication Data

US 2018/0029042 A1    Feb. 1, 2018

Related U.S. Application Data

(63) Continuation of application No. 15/414,316, filed on Jan. 24, 2017, now Pat. No. 9,782,780, which is a continuation of application No. 15/175,294, filed on Jun. 7, 2016, now Pat. No. 9,592,515.

(60) Provisional application No. 62/307,722, filed on Mar. 14, 2016.

(51) Int. Cl.
*B03B 5/38* (2006.01)
*B03B 5/62* (2006.01)
*B03B 11/00* (2006.01)
*B02C 23/10* (2006.01)
(Continued)

(52) U.S. Cl.
CPC ............... *B03B 5/38* (2013.01); *B02C 23/10* (2013.01); *B03B 5/623* (2013.01); *B03B 9/061* (2013.01); *B03B 11/00* (2013.01); *B03C 1/23* (2013.01); *B03B 2009/068* (2013.01);
(Continued)

(58) Field of Classification Search
CPC .... B03B 5/28; B03B 5/30; B03B 5/36; B03B 5/38; B03B 5/58; B03B 5/623; B03B 5/66; B03B 7/00; B03B 9/061; B03B 11/00; B02C 23/10
See application file for complete search history.

(56) References Cited

U.S. PATENT DOCUMENTS

| 1,292,237 A | | 1/1916 | Blomfield | |
| 1,545,636 A | * | 7/1925 | Chance | B03B 5/38 209/172.5 |
| 1,916,392 A | | 7/1933 | Slade | |

(Continued)

FOREIGN PATENT DOCUMENTS

RU    2045351    10/1995

*Primary Examiner* — Joseph C Rodriguez
(74) *Attorney, Agent, or Firm* — SoCal IP Law Group LLP; Guy L. Cumberbatch; Steven C. Sereboff

(57) ABSTRACT

Systems and methods for separating materials and recovery of valuable materials such as from end-of-life vehicles and appliances are disclosed. Vehicles are shredded and resulting pieces are dropped into a fluidic separator that separates the shredded vehicle scrap into heavier pieces and lighter pieces. The fluidic separator separates the bulk of the more valuable metals of the non-metals. The fluidic separator, which may be used for separating many kinds of mixtures of pieces of varying specific gravity, comprises a fluid-filled container in which the pieces and the fluid are stirred so that pieces of specific gravity greater than that of the fluid tend to sink and pieces of specific gravity less than that of the fluid tend to float.

20 Claims, 11 Drawing Sheets

(51) Int. Cl.
*B03B 9/06* (2006.01)
*B03C 1/23* (2006.01)

(52) U.S. Cl.
CPC ........ *B03C 2201/20* (2013.01); *Y02W 30/521* (2015.05); *Y02W 30/524* (2015.05)

(56) References Cited

U.S. PATENT DOCUMENTS

| | | | |
|---|---|---|---|
| 2,854,136 A | 9/1958 | Gillie et al. | |
| 2,877,896 A | 3/1959 | Jones | |
| 3,023,903 A * | 3/1962 | Norton | B03B 5/38 |
| | | | 209/172.5 |
| 3,351,195 A | 11/1967 | Hukki | |
| 4,034,861 A | 7/1977 | Fontein et al. | |
| 4,346,010 A | 8/1982 | Ogino et al. | |
| 4,357,154 A | 11/1982 | Hartung | |
| 4,708,789 A | 11/1987 | Cox | |
| 4,816,156 A | 3/1989 | Brombach et al. | |
| 4,858,769 A | 8/1989 | DeVries | |
| 4,999,115 A | 3/1991 | Peterson | |
| 5,305,888 A * | 4/1994 | Meylor | B03B 5/28 |
| | | | 209/164 |
| 5,601,709 A | 2/1997 | Szymocha et al. | |
| 5,698,099 A | 12/1997 | Fagan et al. | |
| 5,769,238 A | 6/1998 | Gupta | |
| 6,024,226 A | 2/2000 | Olivier | |
| 6,524,473 B2 | 2/2003 | Williamson | |
| 6,730,222 B1 | 5/2004 | Andoh et al. | |
| 7,017,753 B2 | 3/2006 | Tse | |
| 7,905,356 B2 | 3/2011 | Christensen et al. | |
| 7,954,642 B2 | 6/2011 | Jody et al. | |
| 8,268,169 B2 | 9/2012 | Lean et al. | |
| 8,777,016 B2 | 7/2014 | Smith et al. | |
| 8,900,448 B2 | 12/2014 | Fink et al. | |
| 9,068,337 B2 | 6/2015 | Stein | |
| 9,133,044 B2 | 9/2015 | Phattaranawik et al. | |
| 9,592,515 B1 | 3/2017 | Adams et al. | |
| 9,764,361 B2 * | 9/2017 | Valerio | B03B 9/061 |
| 9,782,780 B2 * | 10/2017 | Adams | B03B 5/623 |
| 2003/0141225 A1 | 7/2003 | Liddle et al. | |
| 2006/0283814 A1 | 12/2006 | Williamson et al. | |
| 2009/0065404 A1 | 3/2009 | Paspek, Jr. et al. | |
| 2010/0126913 A1* | 5/2010 | Valerio | B03B 5/44 |
| | | | 209/19 |

* cited by examiner

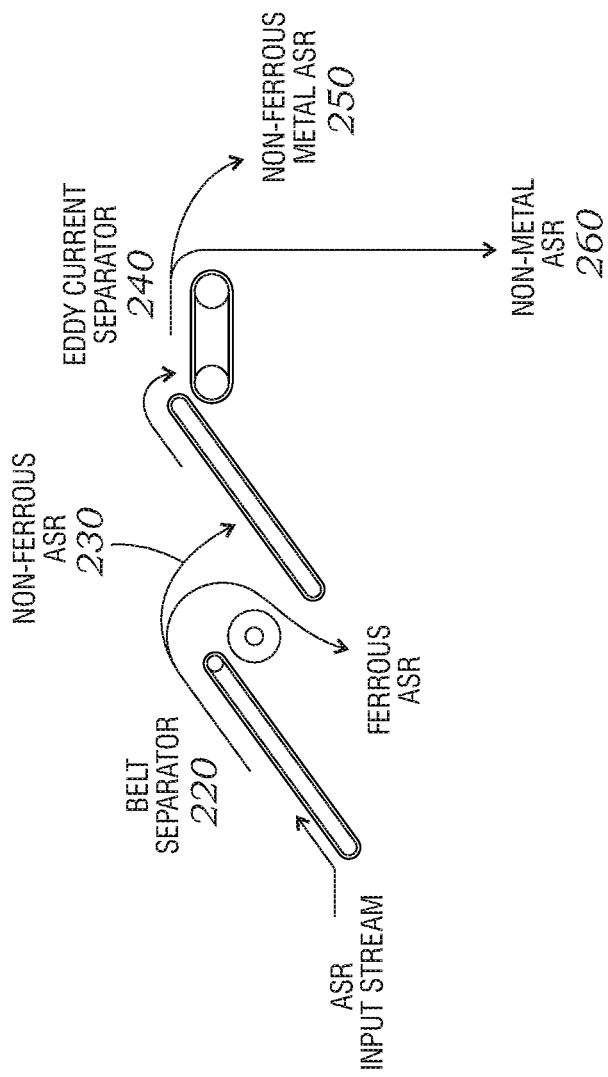

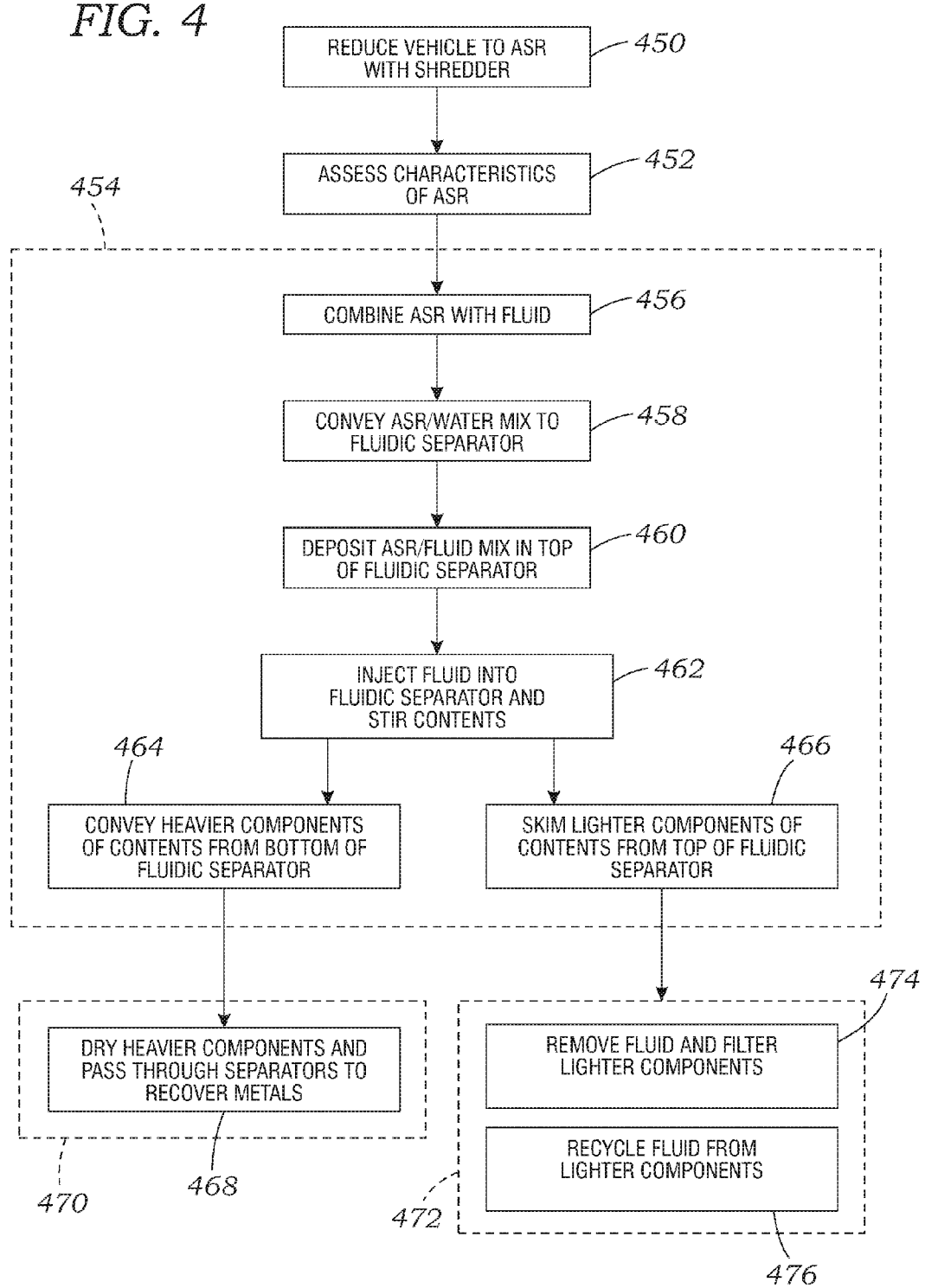

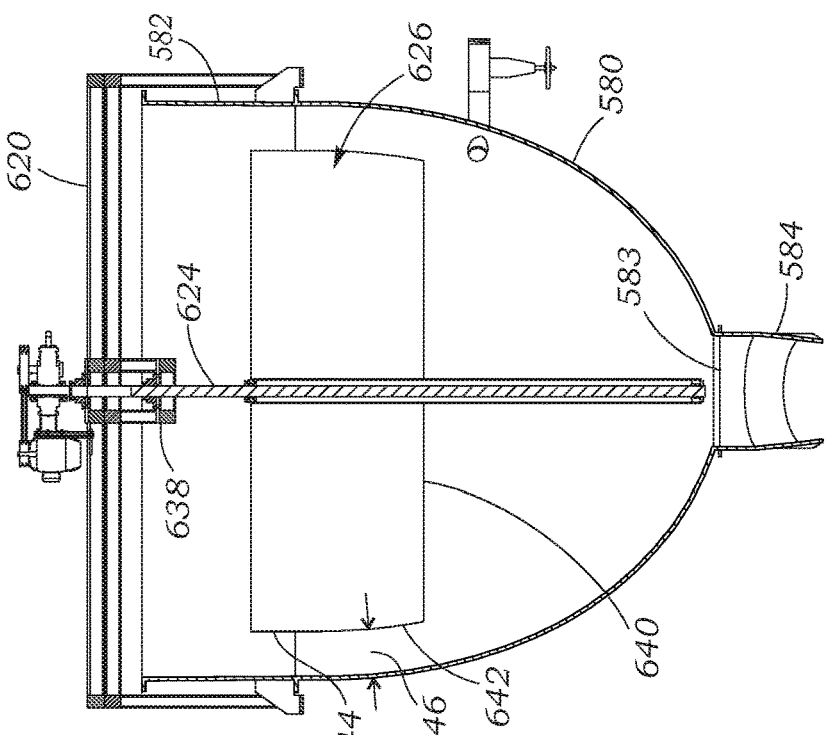
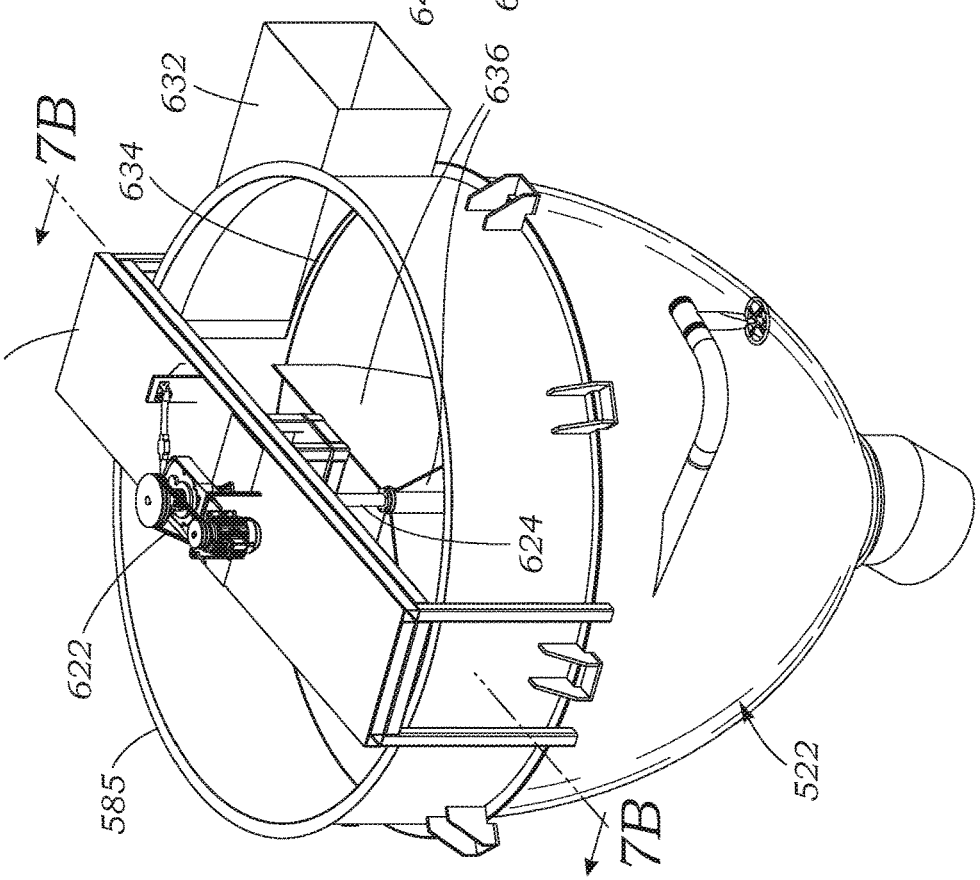
FIG. 7A
FIG. 7B

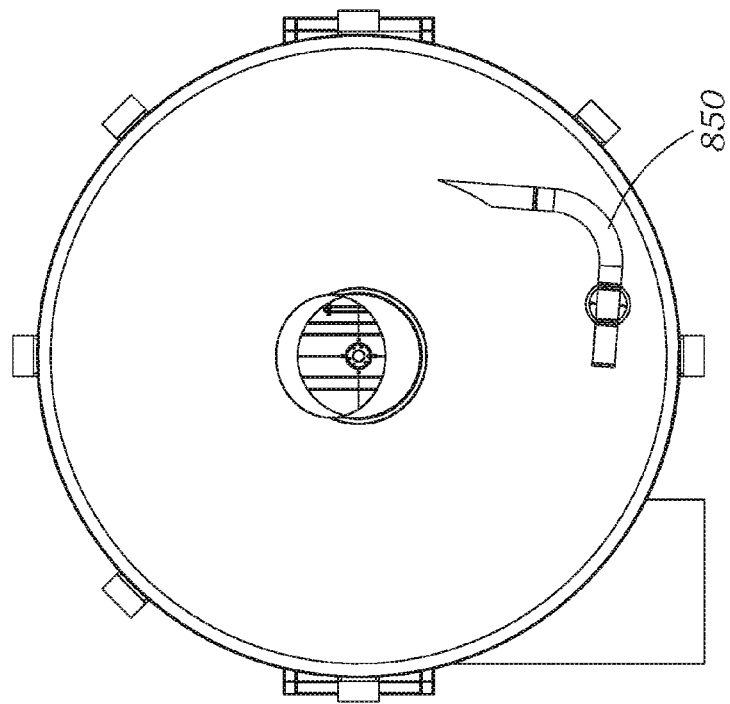
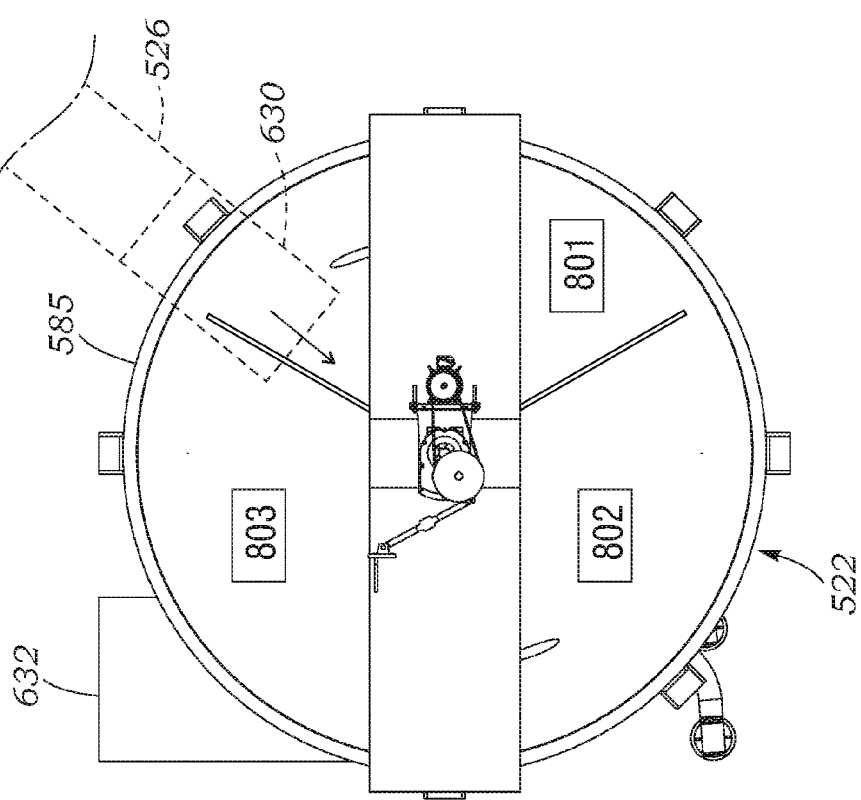

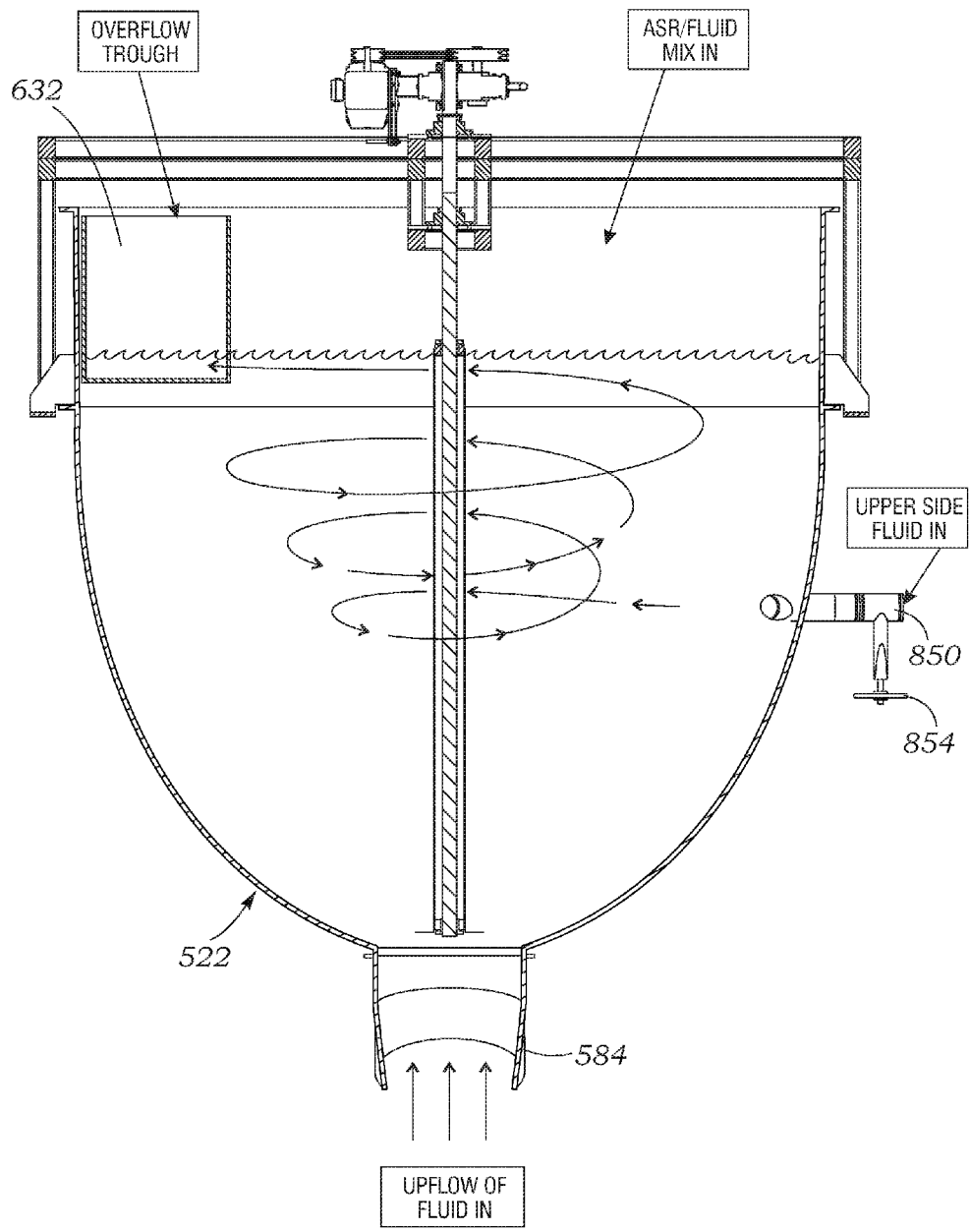

US 10,189,027 B2

HIGH CAPACITY SEPARATION OF METALS FROM AUTO SHREDDER RESIDUE

REFERENCE TO RELATED APPLICATIONS

This patent application is a continuation of Ser. No. 15/414,316, filed Jan. 24, 2017, now U.S. Pat. No. 9,782,780, which is a continuation of Ser. No. 15/175,294, filed Jun. 7, 2016, now U.S. Pat. No. 9,592,515, which claims priority to Provisional Application No. 62/307,722, filed Mar. 14, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to material separation, such as recovery of metals from end-of-life vehicles.

Description of the Related Art

Approximately 12-15 million vehicles reach the end of their use each year in just the United States alone. For economic and ecological reasons, recovery of the metal and other materials contained in the scrap vehicles is becoming more important. About 65% of a typical car is made from steel, and the rest is made of other metals plus glass, rubber, foam and fiber.

The process of vehicle recycling typically first includes the pretreatment or de-pollution (e.g., removal of tires, battery, lubricants and fuel), shredding the vehicle using an industrial shredder (essentially a large hammer mill), and then sorting the shredded pieces to recover valuable material. Sorting is typically accomplished with a series of devices—first to extract ferrous metal pieces and then to extract non-ferrous metal pieces. The rates at which the material separators work can limit productivity and thus profitability.

DESCRIPTION OF THE DRAWINGS

FIG. 2 is a schematic diagram of a tertiary separation process line.

FIG. 4 is a flowchart of a process for recovery of materials.

FIG. 7A is a perspective view and FIG. 7B a vertical sectional view of a container of the fluidic separator.

FIG. 8A and FIG. 8B are top and bottom plan views of the container.

FIG. 9 is a schematic sectional view of the container.

Figure 1:
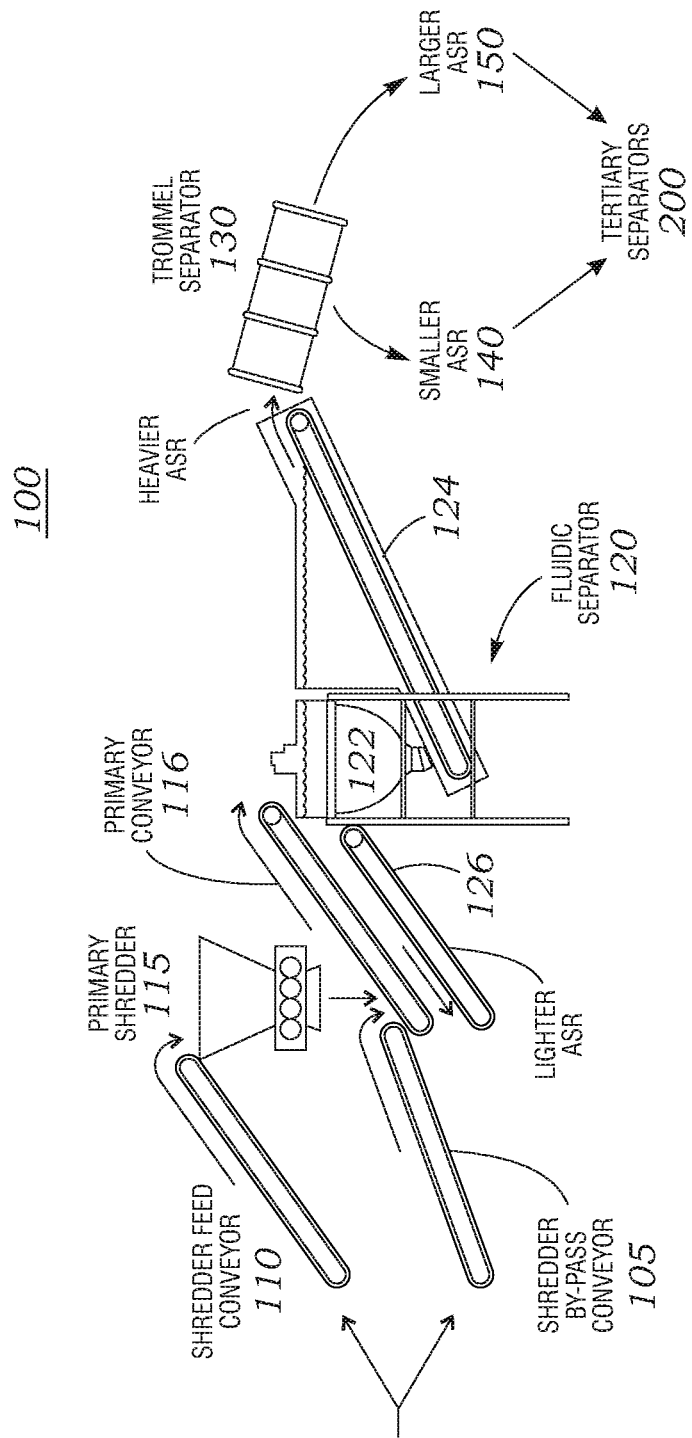
FIG. 1 is a schematic diagram of a system for recovery of materials.

Throughout this disclosure, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Systems and methods for separation of materials are disclosed, and especially for recovery of metal material from end-of-life vehicles. In assembling a vehicle recycling system, the following are certain desirable attributes, in no particular order: high speed of processing; high quality of separation—each type of metal, and non-metals; low environmental impact; low need for manual labor. To further these goals there is provided a fluidic separator which is positioned functionally after the shredder and before other separators. Basically, the fluidic separator acts like an early filter stage taking out the bulk of the less valuable metal material, and the other separators act as finer filter stages.

The fluidic separator comprises a fluid-filled container into which input material is dropped. The container may include a stirring element. Fluid is injected into the container while stirring the contents. Heavier materials (mostly metal) tend to fall to the bottom of the container. At a lower end an opening leads to a conveyor which ascends through a connected chute having a fluid level the same as the container. In this way, the pressures at various elevations in the container and chute are equalized. Lighter material tends to float upward in the container and is removed after spilling over a weir with a flow of fluid. In essence, the fluidic separator uses fluid dynamics to control the pull of gravity on individual pieces of input material to efficiently draw metal pieces down and non-metal pieces up. More particularly, the fluidic separator takes advantage of the variation in the specific gravity of different kinds of the input material. Metal pieces have the highest specific gravity, then comes non-metallic non-floatables (such as some plastic and rubber), then floatables. Changing the specific gravity of the fluid may impact performance. With a specific gravity of one and considerable abundance, water presents an option. However, the fluid may be a liquid having a different specific gravity, and may be a mixture. If the fluid has a specific gravity higher than that of water, some material which would sink in water would instead float.

As used herein, the terms "heavier" and "lighter" refer to relatively greater and lesser specific gravity, respectively. Within the fluidic separator, absolute weight is less important than buoyancy in the fluid. For example, a sixteen ounce piece is lighter than a six ounce piece if the six ounce piece has a greater specific gravity than the sixteen ounce piece.

Referring now to FIG. 1 there is shown a schematic diagram of a system 100 for recovery of materials which implements a multi-stage process. There are two points of entry—a shredder feeder 110 which conveys vehicles or other large items, such as major appliances, into an industrial shredder 115, and a shredder by-pass conveyor 105 which conveys pieces which are already sufficiently small.

In the automobile recycling industry, when an industrial shredder processes an automobile, the output material is commonly known as automobile shredder residue, or ASR.

For convenience, the output material from the industrial shredder 115 will be called ASR, even if it is derived from articles other than automobiles. Also, although the by-pass pieces might not be ASR or shred per se, they are treated the same and called ASR herein.

The ASR from the industrial shredder 115 is combined with the by-pass material onto a primary conveyor 116. The ASR is then transported through a number of separators. Water or other fluid may be applied to the ASR at various points, such as after the industrial shredder 115 (e.g., spraying), inside the industrial shredder 115 (e.g., submersion), and/or to the starting material. A fluidic separator 120 acts as a primary separator. A trommel separator 130, shaker table or other screen-type separator acts as a secondary separator. Prior to the fluidic separator 120, a magnetic separator may be interposed to remove material through magnetism.

ASR comprises a mixture of individual, solid pieces of varying shape, size, mass, specific gravity, composition, density and color. Variations are amongst ASR pieces and may be within ASR pieces. ASR pieces have variations in external shape, which is often irregular but may be regular, and varying surface area. The size of ASR pieces varies considerably, typically from approximately five inches in diameter or more to microscopic. Likewise, some pieces are compact having relatively uniform dimensions in all directions, while others are elongated or planar. An individual ASR piece may be comprised of one or more of ferrous metal, non-ferrous metal (e.g., copper, aluminum), metal alloys, glass, fiber, rubber, liquids, plastics and dirt. The character of ASR pieces in any one load from a shredder depends greatly on the type of vehicle or other material being shredded. ASR pieces vary in color.

The sizes and shapes of the various ASR pieces influence the process of separating heavier from lighter pieces. That is, any one load of ASR pieces has certain characteristics that may differ from other loads. For instance, some loads are predominately lighter pieces, or larger sizes, or conversely may include a greater proportion of large ferrous metal pieces. The character of the ASR pieces affects the rate and efficiency of separation, which in turn may be accommodated by adjusting the fluid flow ratios and rates. Knowledge of the ASR character can thus be translated into an optimum liquid and ASR flow within the container so that the throughput is maximized.

The fluidic separator 120 comprises a mixing container 122, a conveyor of lighter ASR 126 and a conveyor of heavier ASR 124. The fluidic separator 120 mixes the input stream of ASR pieces with water in the mixing container 122 and generates output streams. Lighter ASR pieces are removed from the top of the mixing container 122 on conveyor 126 and form one output stream, and heavier ASR pieces are removed from the bottom of the mixing container 122 on conveyor 124 which is enclosed and form a second output stream. The mixing container 122 and the conveyor 124 are filled with fluid, so the level of airborne contaminants from the system 100 is significantly reduced if not eliminated altogether.

The container 122 has a lower portion with a circular cross section whose walls converge at a lower end, and an upper portion which is substantially cylindrical. The lower portion is shown with parabolic walls. However, the walls of the lower portion may have irregular profiles, or may be regular, and be linear forming an inverted conical shape. In operation the fluidic separator 120 forms an output stream of denser pieces which sink to its bottom.

The stream of heavier ASR pieces is directed from the fluidic separator 120 to the trommel separator 130. The trommel separator 130 separates the ASR pieces by size. The trommel separator 130 comprises a hollow mesh cylinder 132 set at an angle. During operation, the cylinder 132 rotates. The cylinder 132 is open at the top for receiving the stream of heavier ASR pieces from the fluidic separator 120. Smaller ASR pieces fall through the rotating cylinder's mesh via gravity. Larger ASR pieces fall along the inside wall of the cylinder 132 and eventually exit at the cylinder's bottom.

The larger ASR pieces and the smaller ASR pieces are then fed into respective tertiary separation processing lines in the system 100. Metal may be recovered from the streams of smaller ASR and larger ASR via the tertiary separation processing lines. Larger ASR pieces may be further shredded in a secondary shredder (not shown) and then fed back at various points.

Referring now to FIG. 2. There is shown a tertiary separation processing line 200. The tertiary separation processing line 200 includes a belt separator 220 and an eddy current separator 240.

The belt separator 220 is a type of magnetic separator which incorporates magnets (not shown) installed directly under a conveyor belt. The belt separator 220 extracts ASR pieces having sufficient magnetic content—primarily magnetic ferrous metal. As the conveyor belt moves to its last roller and turns under itself, all of the ASR pieces except the magnetic pieces falls off at the turn-under point. The magnetic pieces, on the other hand, stick to the underside of the conveyor belt due to magnetic attraction. The conveyor belt then carries the magnetic pieces to a scraper blade (not shown) which pries off the magnetic pieces.

The removal of non-magnetic metals such as aluminum and copper, as well as non-magnetic stainless steel, may be achieved using the eddy current separator 240. In the eddy current separator 240, a current is induced in the metal pieces by a rapidly rotating rotor having magnets with alternating polarity. The rotating magnetic fields create alternating currents within the metal pieces which create electromagnetic fields of their own. These opposing magnetic fields repel each other, causing the non-ferrous metal pieces to jump off the conveyor belt as it turns into adjacent collection bins.

Figure 3A:
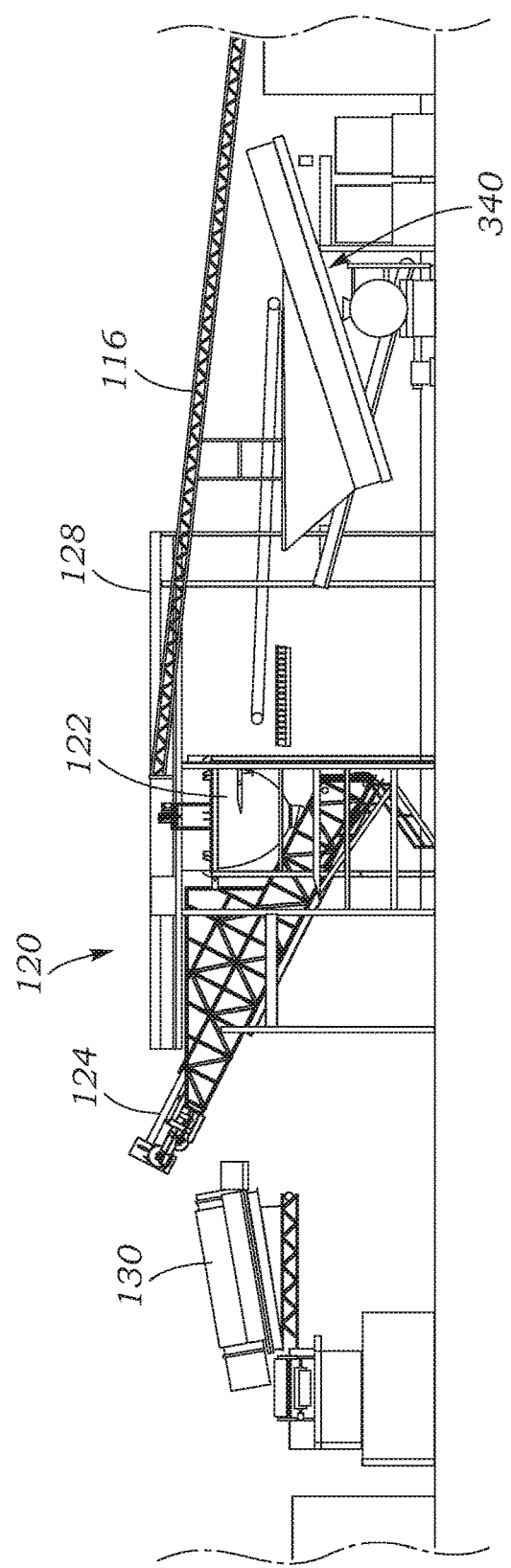
FIG. 3A and FIG. 3B are elevational and plan views, respectively, of portions of the material recovery system.
Figure 3B:
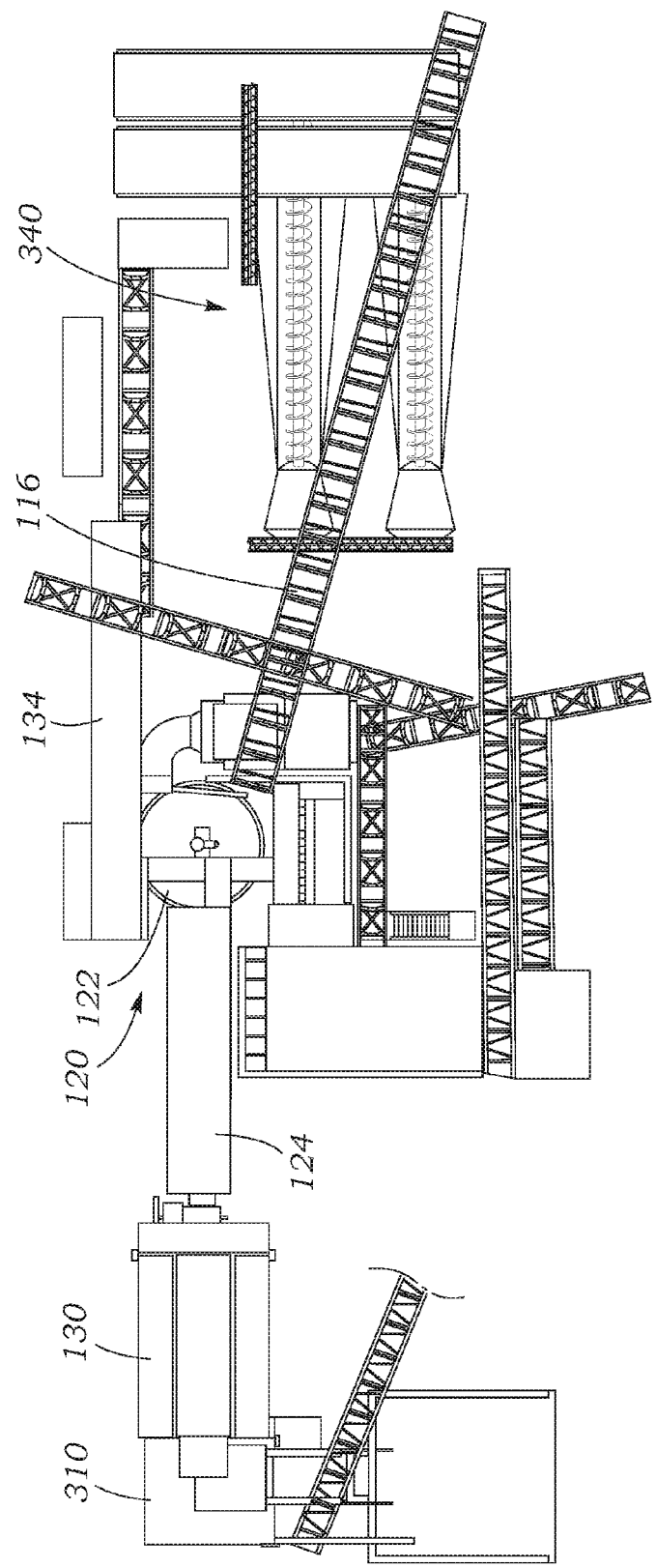

FIG. 3A and FIG. 3B are elevational and plan views, respectively, of portions of the system 100. In particular, the primary conveyor 116 is shown gradually rising to the level of the top of the fluidic separator 120. The outlet conveyor 124 of the fluidic separator 120 rises up from a lower end of the mixing container 122 to the input of the trommel separator 130.

A dewatering device 310 may be positioned at the outlet of the trommel separator 130. The dewatering device 310 reduces the weight of the ASR pieces by removing fluid therefrom. The added fluid weight may impair the performance of the tertiary separation processing line 200, and in particular the eddy current separator 240 (FIG. 2). The dewatering device 310 may be positioned elsewhere, such as just prior to the eddy separator 240, and there may be multiple dewatering devices positioned in the system 100, including drying devices, after the fluidic separator 120. If a fluid other than water used, the dewatering devices will remove the fluid; the term dewatering is used herein for convenience.

An upper trough 134 attached to the top of the fluidic separator 120 channels the lighter ASR pieces and fluid from an upper outlet of the mixing container 122 to be dewatered and sorted further. A series of dewatering devices such as screens and paddle augers shown generally at 340 remove a large quantity of the fluid used in the fluidic separator 120 for subsequent reuse therein.

FIG. 4 is a flowchart of a process for recovering metal and may be employed in a system such as the system 100 of FIG. 1. Vehicles and/or other items are shredded at step 450 into ASR. Next, the ASR is characterized at step 452, and this characterization may be used in modifying operating parameters of elements of the system. The step of shredding 450 and/or characterizing the ASR 452 may be done at the same location as the subsequent steps or at a completely different location, the ASR being transported to the final separation location.

Dashed line box 454 connotes the steps performed by a fluidic separator, such as the illustrated fluidic separator 120. First, the incoming ASR is wetted by combining with fluid at step 456. The input rate of fluid proportional to the flow of ASR is one variable that may be modified for the fluidic separator. Processing some types of ASR may benefit from not adding fluid prior to the ASR's entry into the fluidic separator, and thus step 456 is optional. Likewise, the amount of wetting may be selected from none to light to complete. Step 458 involves conveying the ASR, wetted or dry, to the fluidic separator.

The ASR is then deposited into the fluidic separator at step 460. Concurrently fluid is injected from the sides of the fluidic separator's container and the contents stirred, as shown in step 462. Better performance may be obtained by synchronizing fluid injection with the input flow of ASR, though the injection may be simultaneous with the ASR flow or may be periodic or aperiodic. Fluid injection impacts buoyancy of the ASR. Although some ASR may have a specific gravity greater than that of the fluid, an upwelling of fluid within the container increases the relative differences between buoyancy. In particular, it has been found that the metal ASR pieces are impacted less by fluid upwell than non-metal ASR pieces. This difference is a reflection of their relative specific gravity and also of their fluid dynamic properties. As a result, some heavier non-metal ASR pieces that would sink in a pool of still fluid tend to rise up in the container, but other heavier ASR pieces sink nonetheless. One effect of the fluid up well is to alter the effective specific gravity of the fluid, such that the effective specific gravity is greater than the non-metal ASR but lower than that of the metal ASR.

The fluidic separator produces an output stream at its lower end comprising heavier ASR pieces, mostly metal, which are removed at step 464. Lighter ASR pieces float or are urged upward by the swirling conditions in the fluidic separator to be skimmed off the top thereof at step 466 as another output stream along with a quantity of fluid. At this point the fluidic separator has done its job.

The heavier ASR pieces removed from the fluidic separator are dewatered and passed through separators to recover valuable metals at step 468. The dashed line box 470 connotes any number of steps in this regard, including magnetic belt and eddy current separation.

The lighter components and fluid removed from the fluidic separator at step 466 are then processed through a number of devices represented by dashed line box 472, including devices that dewater and filter the components at step 474 and those that recycle the water at step 476.

Figure 5A:
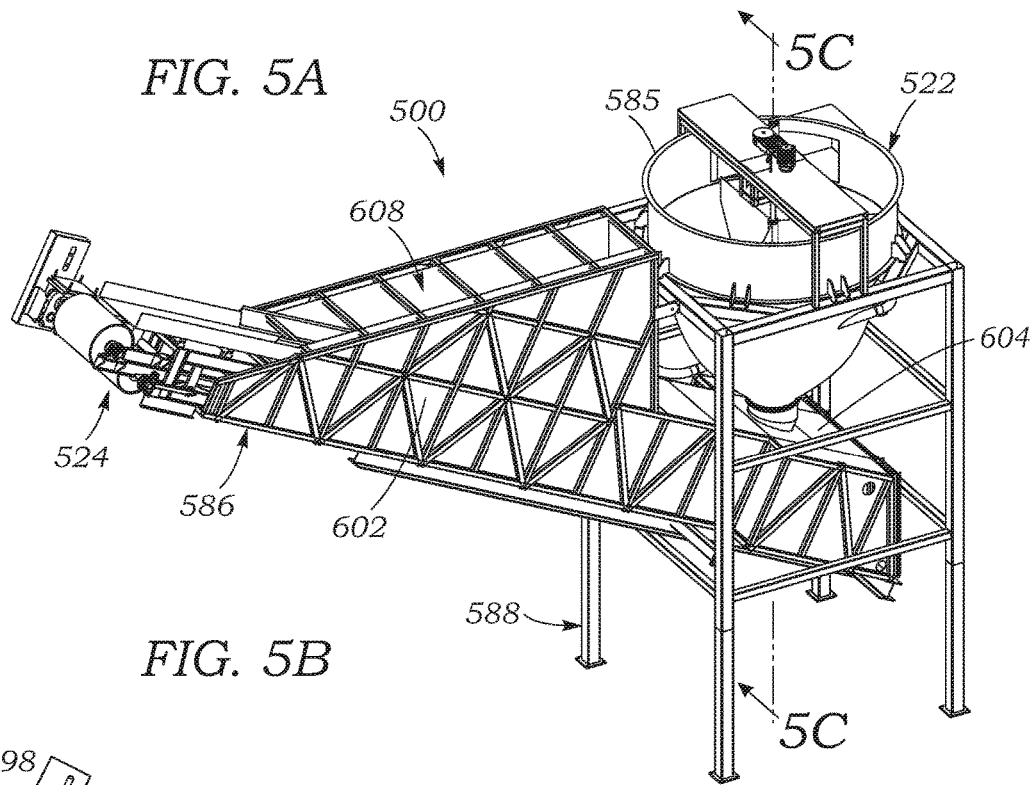
FIG. 5A is a perspective view and FIG. 5B is an elevational view of a fluidic separator.
Figure 5B:
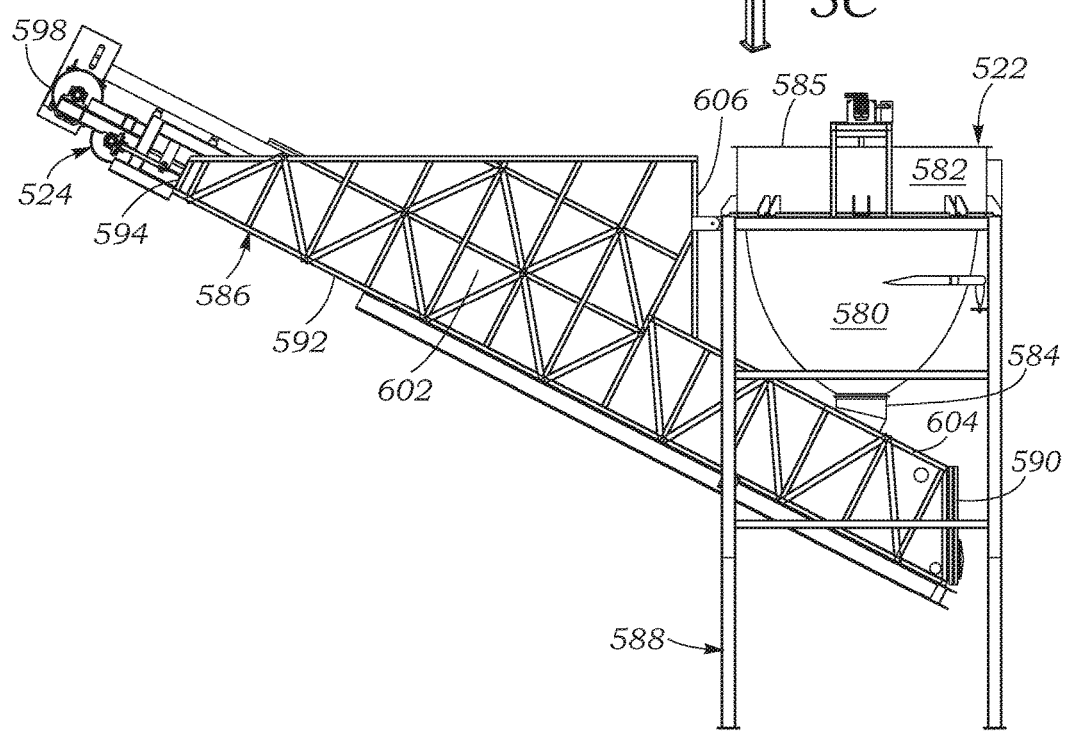
Figure 5C:
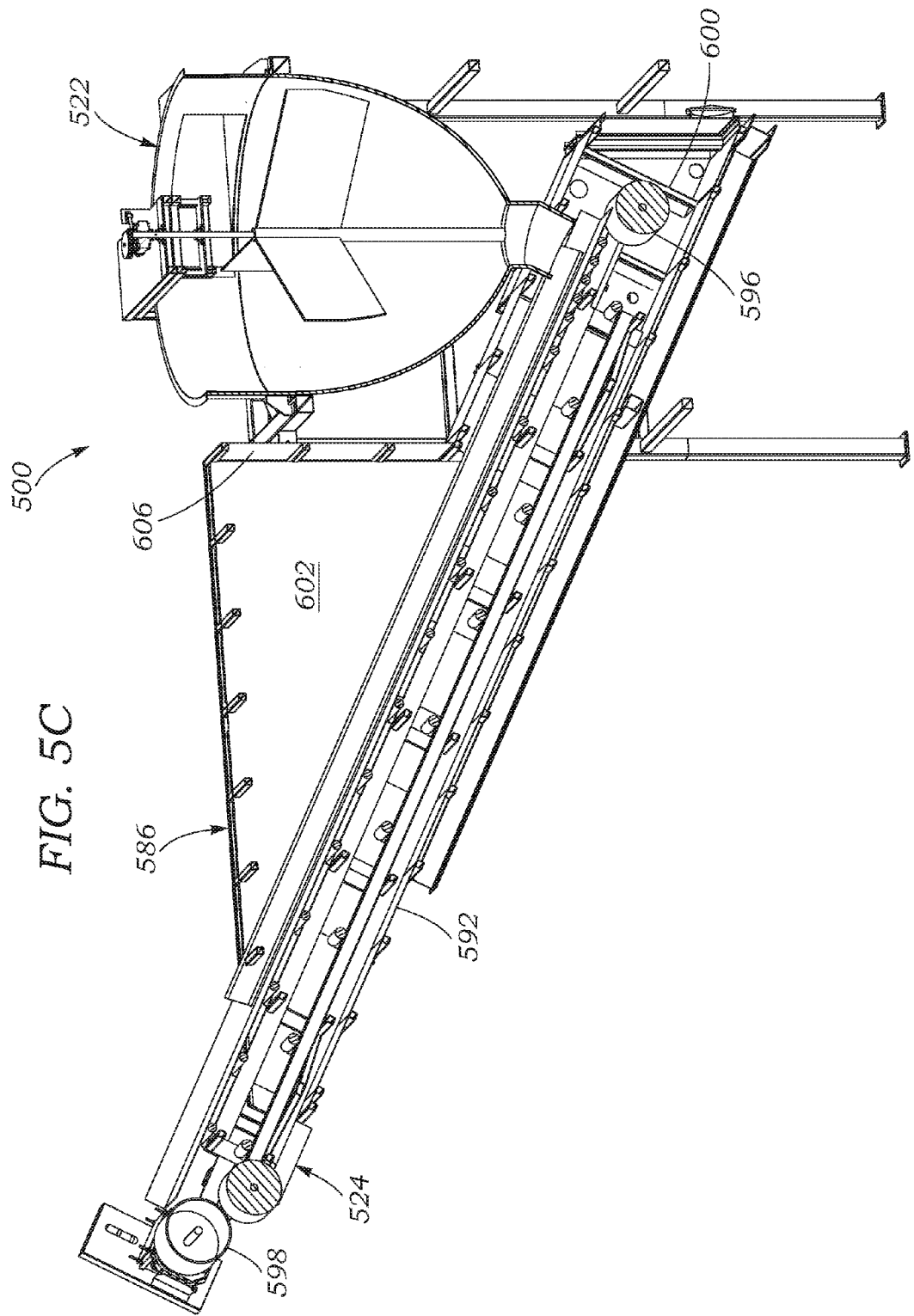
FIG. 5C is a vertical sectional view taken along line 5C-5C of FIG. 5A.

FIG. 5A and FIG. 5B illustrate a fluidic separator 520, which may be the fluidic separator 120 of FIG. 1. FIG. 5C is a vertical sectional view through the fluidic separator 520. The fluidic separator 520 includes a container 522 having a lower section 580 and an upper cylindrical section 582. The bottom of the lower section 580 terminates in a tubular lower outlet conduit 584 and the top of the upper tubular section 582 forms an open, circular mouth 585. The outlet conduit 584 opens directly into a lower end of an angled manifold 586 enclosing the outlet conveyor 524 of the fluidic separator 520. Both the container 522 and manifold 586 housing the conveyor 524 are supported at the relative elevations shown by a strut and spar frame 588.

The manifold 586 comprises a box-like frame enclosing a volume that holds fluid to the same level as a level within the container 522. As seen best in FIG. 5A, a closed bottom end 590 of the manifold 586 is located under the container 522 close to the outlet conduit 584. The manifold 586 has a lower face 592 that extends linearly upward at an angle to an open top end 594. The outlet conveyor 524, as seen best in FIG. 5C, mounts within the manifold 586 along the lower face 592. A lower end 596 of the conveyor 524 resides immediately underneath the outlet conduit 584, and an upper end 598 extends just beyond the manifold 586. Heavier ASR pieces that sink to the bottom of the container 522 drop onto the conveyor 524 and are relayed upward so as to be ejected at the upper end 598 for further processing. FIG. 5C also shows an internal wall 600 within the manifold 586 directly adjacent the lower end 596 of the conveyor 524 which helps prevent heavier ASR pieces from being trapped at the lower recesses of the manifold.

The conveyor 524 and manifold 586 present a smooth upward passage of the heavier ASR pieces harvested from the container 522 with no internal spars or frame supports on which ASR pieces may snag. Alternative to the conveyor 524 and the manifold 586, a smoother, more streamlined arrangement may dispense with much of the internal frame work shown that may interfere with cleaning.

The manifold 586 further includes side walls 602, an upper face 604, and a vertical wall 606 facing the container 522. The side walls 602 at their lower extents and upper face 604 define an enclosed square tube located underneath the container 522 and extending upward to the vertical wall 606. The vertical wall 606 defines the beginning of a widening of the manifold 586 so as to form an upper generally triangular reservoir box 608 (FIG. 5A) that is open to the atmosphere at its top end. Any fugitive lighter ASR pieces that pass out of the container 522 through the lower outlet conduit 584 can then float upward within the reservoir box 608 and be removed manually from time to time.

As seen in FIG. 5B, the upper elevation of the manifold 586 coincides approximately with the upper elevation of the container 522. In use, as mentioned, fluid fills the container 522 and manifold 586 to approximately the same level. This results in equilibrium of static fluid pressure within the two bodies so that there is no pressure gradient in the absence of injected fluid between the two. Consequently, buoyant ASR pieces in the container 522 are not drawn downward within the container 522 by a difference in pressure head. Indeed, fluid supplied to the manifold 586 in excess of the fluid level within the container 522 creates a differential head and forces fluid into the outlet conduit 584 at the bottom of the container 522 such that there is a net upwelling within the container.

Figure 6:
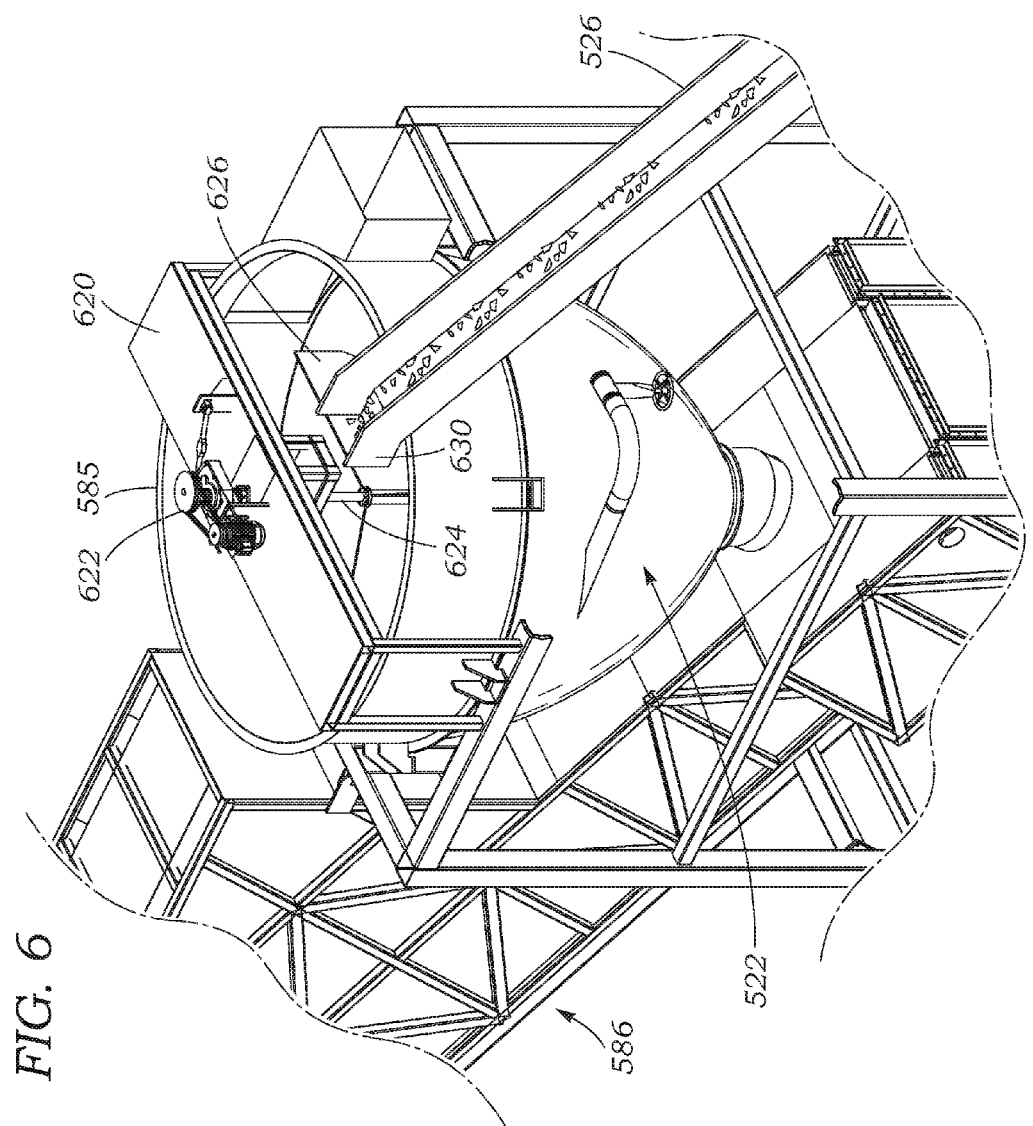
FIG. 6 is a perspective view of an upper mouth of the fluidic separator.

Now with reference to FIG. 6, FIG. 7A, FIG. 7B, FIG. 8A and FIG. 8B, aspects of the container 522 are explained. The upper mouth 585 of the container 522 is shown with an upper beam 620 mounted thereacross that supports a motor and transmission assembly 622. The motor and transmission assembly 622 turns a shaft 624 of a paddle 626 arranged to rotate concentrically within the container 522. FIG. 6 shows the input conveyer 526 and a channel or chute 630 for delivering ASR to a central point within the container mouth 585. That is, ASR is dropped closer to the central axis of the container 522 than at a peripheral edge.

The paddle 126 rotates and the ASR is directed downward into the container 522 in the same direction.

With reference to FIG. 7A and FIG. 7B, the container 522 further includes an upper outlet 632 formed as an overflow trough that leads to an upper trough such as that shown in FIG. 3A and FIG. 3B for channeling buoyant material and water to be dewatered and sorted through a series of dewatering devices shown at 540. The upper outlet 632 is open to the upper tubular section 582 of the container 522 and receives the lighter ASR pieces and fluid over a weir edge 634. The container 522, at the bottom of the lower section 580, has a lower outlet 583 through which can pass fluid and pieces that sink to the bottom of the container 522. Fluid and pieces which pass through the lower outlet form a lower outlet stream of pieces.

FIG. 7B shows the container 522 in vertical section illustrating the relative size of the paddle 626 therein. The paddle 626 has a plurality of vanes 636 (FIG. 7A) extending outwardly from the central shaft 624. FIG. 7A shows three vanes, but any number may be provided, a larger number of vanes may reduce performance, and a low number may provide inadequate performance. The central shaft 624 is firmly held and journaled for rotation about a central axis of the container 522 by a bearing box 638 rigidly mounted under the upper beam 620. In this way, the paddle 626 is suspended within the container 522 without touching its walls and is and journaled for rotation about a fixed axis therein. The vanes 636 mimic the shape of the container 522 with a straight truncated lower edge 640 just above the outlet conduit 584, an angled outer edge 642 extending upward parallel to the lower section 580, and a vertical outer edge 644 at the top that extends into the upper tubular section 582. The vanes 636 are relatively large within the container 522 interior so that they extend nearly all the way to the walls thereof. There may be a spacing 646 between the vanes 636 and the walls of the container 522 which provides room for ASR pieces to circulate around the inside wall of the container 522 with heavier ASR pieces gradually sinking and lighter ASR pieces rising upward. The upper beam 620 strengthens the paddle and provides a place to stand while cleaning.

With respect to the top and bottom plan views of the container 522 of FIG. 8A and FIG. 8B, three regions 801-803 are shown. The terminal end of the input conveyer 526 and chute 630 are shown directed toward the middle of the container mouth 585 in region 801. As the paddle 626 rotates, the ASR pieces then must move nearly 360° around the container 522 before reaching region 803 where the upper outlet 632 is located. This provides a period of time for the ASR pieces to begin to sort between lighter and heavier pieces prior to reaching the upper outlet 632 so that heavier pieces are not inadvertently spilled out.

FIG. 8B (and FIG. 7A) shows a fluid inlet pipe 850 mounted to the lower section 580 of the container 522. There may be additional fluid inlet pipes, such as a diametrically opposed upper pair of inlet pipes and a diametrically opposed pair of lower inlet pipes, in which fluid is injected by the upper pair at locations into the container 522 interior at a higher elevation than the lower pair. Each of the pipes opens into the container 522 in a pseudo-tangential orientation so that the water injected enters the container 522 with a rotational flow which is consistent with the direction of rotation of the paddle 626. A valve 854 is provided to control the flow rate through the inlet 850. Likewise, valves may be provided for each inlet pipe, or for gangs of inlet pipes.

FIG. 9 is a schematic sectional view of the container 522 illustrating inlet flows of fluid and ASR pieces. The fluidic separator has a fluid up well subsystem for moving fluid over a period of time in an upward direction, the fluid up well subsystem causing at least a majority of the lighter, non-floatable pieces to rise to the upper outlet and without preventing at least a majority of the heavier non-floatable pieces from sinking to the lower outlet. That is, whereas pieces of higher specific gravity than the fluid would sink if the fluid were still, the fluid up well subsystem creates motion within the container that causes a selected type of pieces to rise while allowing others to sink.

The fluid up well subsystem has three main components: fluid injection from one or more points on the side of the container, a fluid up well from the lower outlet 583 of the container, and the paddle 626. The fluid up well system may include valves and pumps disposed to control and cause appropriate fluid flows.

The ASR pieces and added fluid (if utilized) enter the container 522 from above. A differential head of fluid between the adjacent manifold 586 and container 522, as explained above, produces an up flow of fluid into the container supplied from an inlet at the lower channel 584. Finally, one or more of the inlet pipes 850 introduce fluid into the container 522. The result is a gradual upwelling of fluid that swirls around the central axis of the container 522 by virtue of the direction of the inlet pipes and the rotating paddle 626. The configuration of the various water inlets could be modified, such as by providing more or less side inlets or a dedicated fluid inlet pipe at the bottom.

The relative amounts of fluid introduced into the container 522 from the top, sides and bottom may be adjusted based upon a number of factors. The primary factors are the nature of the fluid and the nature of the incoming ASR pieces. The flow rate of the input stream of pieces is also important, as are the relative dimensions of various components of the fluidic separator. Furthermore, the fluidic separator may have varying performance at start-up and shut-down versus steady state. Even during steady state conditions, the nature of the ASR pieces may change significantly. The various rates may be guided by finite element analysis. A set of reference flow rates may be initially set and then adjusted to improve throughput. For instance, to start, a majority of the fluid may be supplied from the sides, and the rest input through the bottom 584. The sides may input sixty, seventy, eighty or ninety percent. In some cases it may be beneficial to pre-wet the incoming ASR. For example, less than ten percent, and maybe three, four, five or six percent of the fluid entering the container 522 may come in at its open top. The fluid entering from the sides can be regulated to flow in more through various inlet pipes, depending on desired results. The process may be iterative and an empirical ratio of fluid flow rates may be determined by trial and error. Alternatively, the system may have a number of sensors and controllers to allow automation of various flow characteristics to achieve desired results.

Input flow from the sides of the container 522 encourages mixing and separation due to variations in the specific gravity of different kinds of ASR. There may be multiple side inlets aimed so that the incoming flow swirls in the same direction as the rotating paddle. That is, one or more side inlets may be aimed or otherwise configured to inject fluid in a rotational direction. There may be side inlets at different elevations around the container 522, such as at or near its middle, at or near its bottom, or at points such as one quarter or one third from the top or bottom. The flow from the various inlets may be balanced, and may be even. The fluid from the side inlets may be low or high pressure, with varying pressure levels providing varying degrees of washing performance of the ASR pieces.

The performance of the fluidic separator depends on the relationship between the construction/operation of its top portion and the construction/operation of its bottom portion. Relative and absolute sizes are significant, as are speed of motion and fluid pressure.

The inlets of the fluid up well subsystem may be positioned or configured at various angles relative to the walls of the container. Accordingly, fluid may be introduced perpendicularly into the container, or at varying angles. Fluid introduced at an angle which coincides with the direction of the paddle will cause or enhance motion of the container's contents in that direction. This angle may be shallow or acute, and may be selected based upon the container configuration. As more fluid enters the container it may follow the existing directional flow and rise while adhering to the outer walls of the container until the fluid reaches the exit and flows out over the top. The paddle mixer turns with the fluid, with the paddles speed controlled to obtain desired performance. Some benefit may be obtained if the coriolis effect is considered in component arrangement.

With regard to solid material separation, starting from the material inlet chute the ASR pieces flows into the center of the container leaving the heavier pieces to settle towards the bottom. Once close to the bottom, the pieces are acted upon by relative float/sink properties of the fluid. The pieces are also acted upon by the violent mixing created by pumped fluid and centrifugal forces from the paddle mixer. As all of these forces interact a separation begins to appear. Starting with the very light materials such as wood and foam, they start to float upward and the heavier material stays towards the bottom. All the while, everything is being washed and separated. Finally, the heavier fraction is discharged onto the submerged conveyor.

In a typical recycling system, the speed of processing is limited by speed of operation of the eddy current separator. Doubling processing is typically accomplished by doubling the size of the eddy current separator, or running multiple lines, but at considerable cost. By using the fluidic separator, the overall speed of a processing line may increase by more than one hundred percent. Whereas previous recycling systems typically could process up to forty to forty five tons of ASR per hour, processing speeds of recycling systems utilizing the presently disclosed concepts reach one hundred to one hundred fifty tons of ASR per hour. Because the fluidic separator acts as a rough screen, the eddy current separator can run faster. Having a first separation step may also improve the quality of the end product.

The environmental impact may improve, too. Where the fluidic separator uses water, the machine may recycle most of the water it needs, so that the burden is low. In addition, wetting the ASR reduces the amount of airborne contaminants which the overall process generates, and this is a significant environmental benefit. Airborne particles may impact the health of nearby humans and equipment. Too, the airborne particles can have toxic components. Once wetted, there may be less airborne toxic matter, the wetted particles can be more easily captured, and the toxic matter may be isolated more efficiently and effectively.

The fluidic separator also provides reduced costs. It may be efficient from a power standpoint. Finally, no extra manual labor is needed, so the labor demands remain low.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for separating automobile shredder residue (ASR) pieces in an aquatic separator for separating the pieces over time, the method comprising:

providing an aquatic separator with a container defining a lower portion with a circular cross section whose walls converge at a lower end, and an upper portion which is substantially cylindrical, the container further having an open top mouth larger than a lower outlet at the lower end and a paddle suspended across the open top mouth and depending down into an interior of the container, the paddle configured to rotate in a direction of rotation about a central axis of the container and having vanes that are spaced from an interior wall of the container and stir ASR pieces and water within the container;

introducing in an input stream a mixture of ASR pieces of varying specific gravity and water directly into the open top mouth of the container;

stirring the ASR pieces and the water in the container in a first direction of rotation about a central axis, wherein heavier pieces of specific gravity greater than that of the water tend to sink and the lighter pieces of specific gravity less than that of the water tend to rise, which separates the pieces into primarily heavier metals and primarily lighter non-metals;

injecting water into the container via at least one inlet in a side wall of the container generally parallel to the direction of rotation;

removing a majority of the heavier pieces from the container through the lower outlet of the container in a lower output stream; and removing a majority of the lighter pieces from the container through an upper outlet in one side of the container in an upper output stream.

2. The method of claim 1 wherein the container receives a total water flow in, and at least sixty percent of the total water flow into the container enters through the at least one inlet in the side wall of the container.

3. The method of claim 1 wherein the at least one inlet in the side wall of the container comprises a first diametrically opposed pair of the inlets in the side wall of the container, and the step of injecting water into the container comprises injecting water through the first diametrically opposed pair of the inlets and controlling the flow rates through each inlet.

4. The method of claim 1 including directing the input stream toward a center of the upper end of the container, wherein the input stream is directed to a region of the upper end of the container in the first direction of rotation around the central axis relative to the upper outlet so that the ASR pieces are rotated nearly 360° around the container by the paddle before reaching the upper outlet.

5. The method of claim 1 including delivering both the upper and lower output streams to a series of dewatering devices to recover water and returning the recovered water to the container.

6. The method of claim 5 including delivering ASR pieces that have passed through the dewatering devices to a series of secondary filters including at least one magnetic separator and at least one eddy current separator that respectively separate magnetic ferrous and non-magnetic metal pieces from other pieces.

7. A method for separating automobile shredder residue (ASR) pieces in an aquatic separator for separating the pieces over time, the method comprising:
providing an aquatic separator with a container defining a lower portion with a circular cross section whose side wall converges at a lower end, the container further having an open top mouth and a paddle configured to rotate in a direction of rotation about a central axis of the container and having vanes that are spaced from an interior wall of the container and stir ASR pieces and water within the container;
introducing in an input stream a mixture of ASR pieces of varying specific gravity and water directly into the open top mouth of the container;
introducing water into the container through a lower outlet of the container for moving water in the container in an upward direction, the upwardly moving water and stirring with the paddle causing at least a majority of lighter ASR pieces of specific gravity less than that of water to rise to the upper outlet without preventing at least a majority of heavier ASR pieces of specific gravity greater than that of water from sinking to the lower outlet;
removing a majority of the lighter ASR pieces from the container over an upper weir of the container having a vertical elevation below that of a top end of the paddle vanes;
dewatering and filtering the lighter ASR pieces removed over the upper weir so as to remove water and metallic pieces therefrom, and recycling water recovered from the lighter ASR pieces by returning the water to the container;
removing a majority of the heavier ASR pieces from the container through the lower outlet of the container; and
filtering the heavier ASR pieces removed through the lower outlet using at least one magnetic separator and at least one eddy current separator that respectively separate magnetic ferrous and non-magnetic metal pieces from other pieces.

8. The method of claim 7 further including injecting water into the container via at least one inlet in the side wall of the container, wherein the container receives a total water flow in, and at least sixty percent of the total water flow into the container enters through the at least one inlet in the side wall of the container.

9. The method of claim 8 wherein less than 10% of the total water flow into the container enters with the upper inlet stream.

10. The method of claim 8 wherein the at least one inlet in the side wall of the container comprises a first diametrically opposed pair of the inlets in the side wall of the container, and the step of injecting water into the container comprises injecting water through the first diametrically opposed pair of the inlets and controlling the flow rates through each inlet.

11. The method of claim 7 including directing the input stream toward a center of the open top mouth of the container, wherein the input stream is directed to a region of the open top mouth of the container in the first direction of rotation around the central axis relative to the upper outlet weir so that the ASR pieces are rotated nearly 360° around the container by the paddle before reaching the upper outlet weir.

12. The method of claim 7 including providing a manifold adapted to contain water into which the lower outlet opens and having an upper elevation that coincides approximately with an elevation of the upper weir, wherein the method includes filling the container and manifold with water to approximately the same level to result in an equilibrium of static fluid pressure within the container and manifold such that further water supplied to the manifold creates a differential head and introduces water into the container through the lower outlet, the manifold further having an outlet conveyor a lower end of which is located directly underneath the lower outlet and an upper end which projects out of an open top end of the manifold for transporting the heavier ASR pieces removed through the lower outlet.

13. The method of claim 12 including dewatering the heavier ASR pieces directly after leaving the conveyor to remove water therefrom prior to the step of filtering the heavier ASR pieces.

14. A method for separating automobile shredder residue (ASR) pieces in an aquatic separator for separating the pieces over time, the method comprising:
providing an aquatic separator with a container whose side wall converges to a lower outlet at a lower end, the aquatic separator having an open top mouth and a paddle configured to rotate in a direction of rotation about a central axis of the container and having vanes that are spaced from an interior wall of the container and stir ASR pieces and water within the container;
introducing in an input stream a mixture of ASR pieces of varying specific gravity and water directly into the open top mouth of the container;
introducing water into the container through the lower outlet of the container;
injecting water into the container via a first diametrically opposed pair of the inlets in the side wall of the container generally parallel to the direction of rotation and and controlling the flow rates through each inlet, wherein the container receives a total water flow in, and a majority of the total water flow into the container enters through the inlets in the side wall of the container;
removing a majority of the lighter ASR pieces from the container over an upper weir of the container;

removing a majority of the heavier ASR pieces from the container through the lower outlet of the container; and filtering the heavier ASR pieces removed through the lower outlet using at least one magnetic separator and at least one eddy current separator that respectively separate magnetic ferrous and non-magnetic metal pieces from other pieces.

15. The method of claim 14 wherein less than 10% of the total water flow into the container enters with the upper inlet stream.

16. The method of claim 15 also including a second diametrically opposed pair of the inlets in the side wall of the container wherein at least 60% of the total water flow into the container enters through the two pairs of inlets in the side wall of the container.

17. The method of claim 14 including directing the input stream toward a center of the open top mouth of the container, wherein the input stream is directed to a region of the upper end of the container in the first direction of rotation around the central axis relative to the upper outlet weir so that the ASR pieces are rotated nearly 360° around the container by the paddle before reaching the upper outlet weir.

18. The method of claim 14 including providing a manifold adapted to contain water into which the lower outlet opens and having an upper elevation that coincides approximately with an elevation of the upper weir, wherein the method includes filling the container and manifold with water to approximately the same level to result in an equilibrium of static fluid pressure within the container and manifold such that further water supplied to the manifold creates a differential head and introduces water into the container through the lower outlet, the manifold further having an outlet conveyor a lower end of which is located directly underneath the lower outlet and an upper end which projects out of an open top end of the manifold for transporting the heavier ASR pieces removed through the lower outlet.

19. The method of claim 18 including dewatering the heavier ASR pieces directly after leaving the conveyor to remove water therefrom prior to the step of filtering the heavier ASR pieces.

20. The method of claim 14 including dewatering and filtering the lighter ASR pieces removed over the upper weir so as to remove water and metallic pieces therefrom, and recycling water recovered from the lighter ASR pieces by returning the water to the container.

* * * * *